(12) United States Patent
Wilkinson

(10) Patent No.: US 6,650,277 B1
(45) Date of Patent: Nov. 18, 2003

(54) TARGET DESIGNATION SYSTEM

(75) Inventor: James Albert Wilkinson, Ventura, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/219,383

(22) Filed: Aug. 12, 2002

(51) Int. Cl.[7] .............................. F41G 7/00; F41G 9/00
(52) U.S. Cl. .............................. 342/62; 342/42; 342/43; 342/45; 342/61; 244/3.1; 244/3.11; 244/3.14
(58) Field of Search .............................. 89/1.11, 41.03, 89/41.17; 244/3.1, 3.11–3.17; 342/42–45, 51, 61–65, 385; 356/5.04, 151; 372/109; 348/164

(56) References Cited

U.S. PATENT DOCUMENTS

| | | | | |
|---|---|---|---|---|
| 3,750,163 A | * | 7/1973 | Hecker | 342/45 |
| 4,028,991 A | * | 6/1977 | Kuby | 89/41.03 |
| 4,047,117 A | * | 9/1977 | Tuchyner et al. | 244/3.16 |
| 4,091,412 A | * | 5/1978 | Salonimer | 244/3.16 |
| 4,259,009 A | * | 3/1981 | Jernigan | 244/3.16 |
| 4,349,838 A | * | 9/1982 | Daniel | 244/3.13 |
| 4,738,044 A | * | 4/1988 | Osterhout | 356/252 |
| 4,916,713 A | * | 4/1990 | Gerber | 372/109 |
| 5,007,736 A | * | 4/1991 | Daniel et al. | 244/3.16 |
| 5,142,288 A | * | 8/1992 | Cleveland | 342/45 |
| 5,473,331 A | * | 12/1995 | Kennedy et al. | 342/62 |
| 5,568,152 A | * | 10/1996 | Janky et al. | 89/41.17 |
| 5,651,512 A | * | 7/1997 | Sand et al. | 244/3.11 |
| 5,685,504 A | * | 11/1997 | Schneider et al. | 244/3.11 |
| 5,745,575 A | * | 4/1998 | Otto et al. | 342/45 |
| 5,748,138 A | * | 5/1998 | Telle et al. | 342/45 |
| 5,990,939 A | * | 11/1999 | Sand et al. | 348/164 |
| 6,025,795 A | * | 2/2000 | Hulderman et al. | 342/45 |
| 6,515,737 B2 | * | 2/2003 | Perry | 356/5.04 |

\* cited by examiner

Primary Examiner—Bernarr E. Gregory
(74) Attorney, Agent, or Firm—David S. Kalmbaugh

(57) ABSTRACT

A target designation system for indicating a target to be destroyed by remotely guided ordnance comprises a receiver arranged to produce a receiver output signal in response to an incident electromagnetic signal from an attack aircraft. A switch is connected to the receiver and arranged to produce a power ON/OFF signal in response to the receiver output signal. A transmitter is connected to the auto-switch to be selectively activated and deactivated by the power ON/OFF signal. When activated, the transmitter transmits a homing signal that indicates its location or the location of the target being illuminated by the transmitter signal.

9 Claims, 2 Drawing Sheets

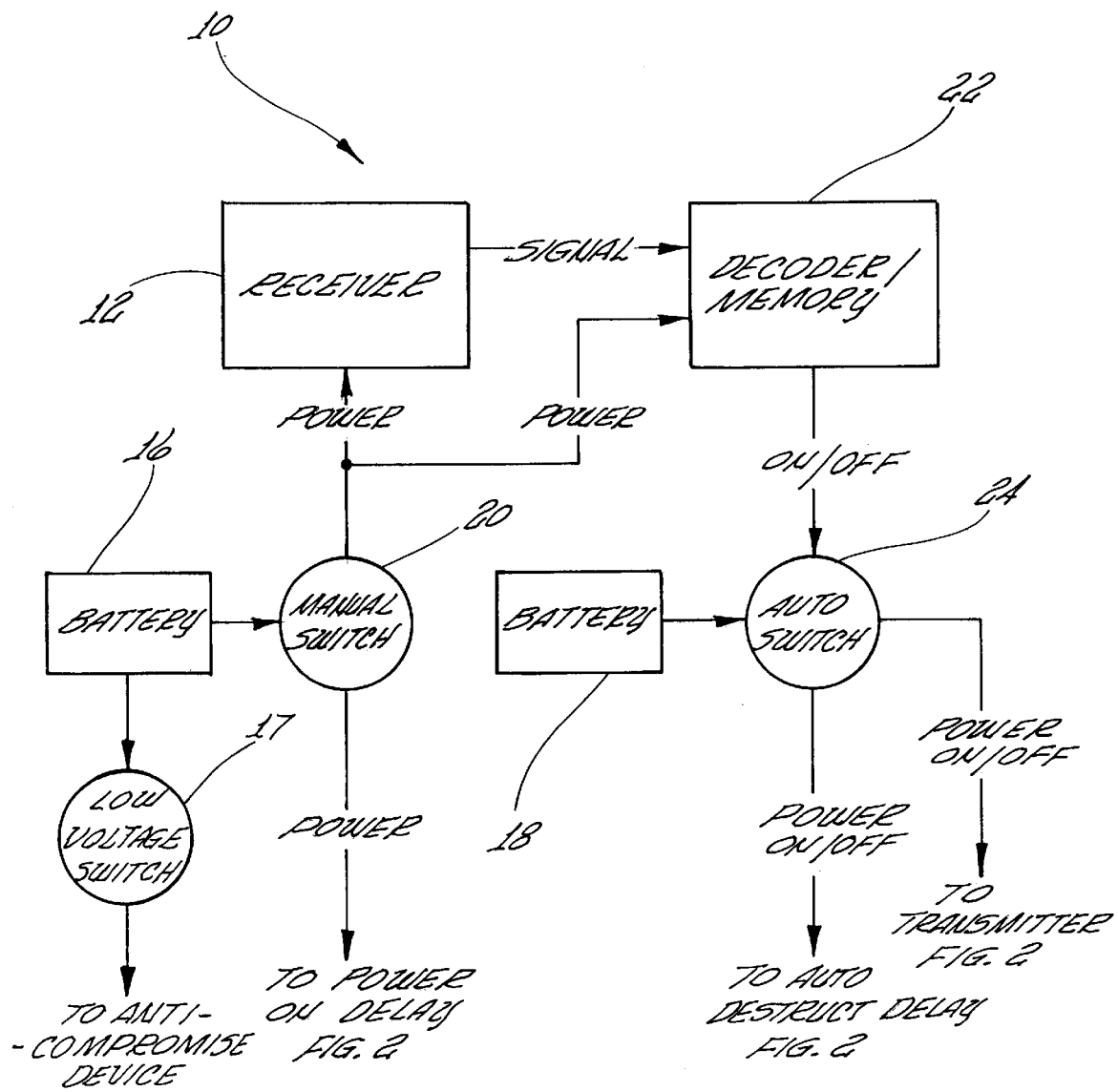

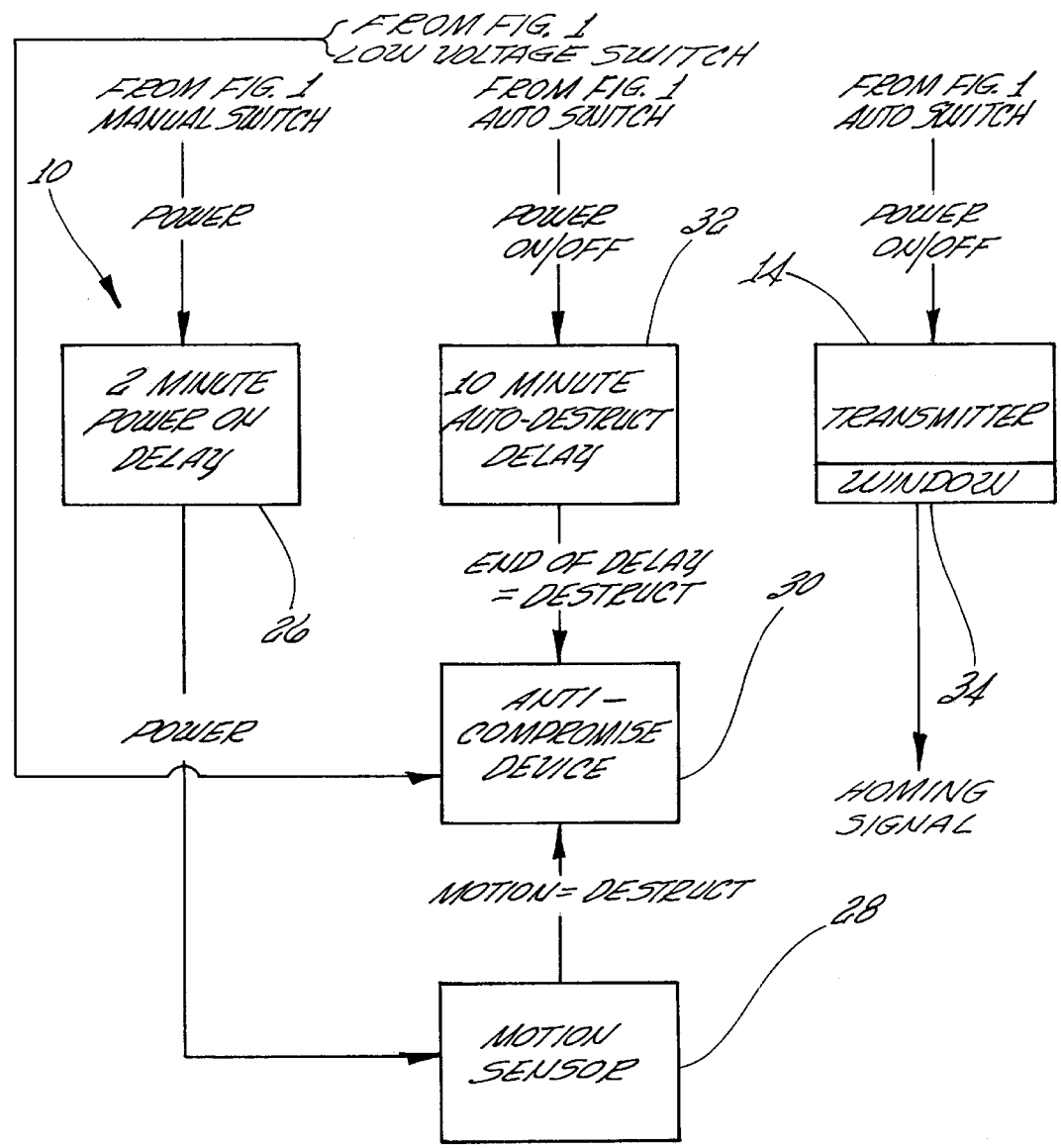

TARGET DESIGNATION SYSTEM

BACKGROUND OF THE INVENTION

1. Field of the Invention

This invention relates generally to systems for designating targets for destruction by aircraft bombardment. This invention relates particularly to systems for directing "smart" bombs to specific targets.

2. Description of the Prior Art

Remotely guided ordnance currently employs ground or airborne target designators that involve placing personnel and equipment in danger. Present target designation systems are hampered because intelligence on target position and target value can be out of date or simply not sufficiently accurate to avoid wasting valuable ordnance and/or causing unnecessary collateral damage.

SUMMARY OF THE INVENTION

The present invention is directed to a target designation system that overcomes the foregoing problems. A target designation system according to the present invention for indicating a target to be destroyed by remotely guided ordnance such as a smart bomb comprises a receiver arranged to produce a receiver output signal in response to an incident electromagnetic signal from an attack aircraft, an auto-switch arranged to produce a power ON/OFF signal in response to the receiver output signal and a transmitter connected to the auto-switch to be selectively activated and deactivated by the power ON/OFF signal. When activated, the transmitter transmits a homing signal that indicates its location so that ordnance may be delivered to the target.

The target designation system preferably includes a decoder/.Memory circuit connected between the receiver and the auto-switch. The decoder/memory circuit is arranged to produce an ON/OFF signal that selectively turns the auto-switch ON and OFF when the incident electromagnetic signal has a predetermined frequency and is encoded with a preset code. The predetermined frequency and preset code preferably identify the target designation system by serial number and location.

The target designation system may further comprise an electrical power source connected to the receiver via a manual switch. The manual switch preferably is also connected to the decoder/memory circuit to provide electrical power thereto.

The target designation system preferably further comprises a motion sensor connected to the manual switch and arranged to produce a destruct signal in response to motion of the target designation system. The target designation system 10 has an anti-compromise circuit connected to the motion sensor and arranged to destroy the target designation system in response to the destruct signal. The target designation system preferably also further comprises a power ON delay circuit connected between the motion sensor and the manual switch. The power ON delay circuit is arranged to provide a selected power ON delay time between when the manual switch is turned ON and electrical power is applied to the motion detector.

The target designation system may also comprise an auto-destruct delay circuit connected between the auto-switch and the anti-compromise circuit. The auto-destruct delay circuit is arranged to activate the anti-compromise circuit after a preset auto-destruct delay time from when the auto-switch was turned ON.

BRIEF DESCRIPTION OF THE DRAWINGS

FIGS. 1 and 2 together illustrate a circuit block diagram of a target designation system according to the present invention.

DETAILED DESCRIPTION OF THE INVENTION

As shown in FIGS. 1 and 2, a target designation system 10 includes a receiver 12 and a transmitter 14. A battery 16 is arranged to serve as an electrical power source for receiver 12. A battery 18 is arranged Lo serve as an electrical power source for transmitter 14.

Referring to FIG. 1, a switch 20 that is preferably manually operated is connected between receiver 12 and battery 16. Switch 20 also is connected between a decoder/memory circuit 22 and battery 16. When switch 20 is manually switched ON, electrical power from battery 16 is supplied to receiver 12 and decoder/memory circuit 22.

Receiver 12 preferably is arranged to produce a receiver output signal in response to an intercepted electromagnetic signal that preferably is either a laser signal, a radio-frequency (RF) signal or an infrared (IR) signal. The electromagnetic signal preferably has a predetermined frequency and preferably is encoded.

The receiver output signal is input to a decoder/memory circuit 22 that may be either a separate component as shown or, alternatively, integral to receiver 12. If the receiver output signal is encoded in accordance with a preset code, decoder/memory circuit 22 produces an ON/OFF signal that is applied to a switch 24. Switch 24 preferably is an auto-switch that operates in response to the ON/OFF signal from decoder/memory circuit 22. Switch 24 is connected between battery 18 and transmitter 14 so that a power ON/OFF signal is supplied to transmitter 14 after switch 24 is turned ON by an appropriate signal from decoder/memory circuit 22. Transmitter 14 preferably sends out a signal that is a laser, an RF signal or an IR signal.

Referring to FIGS. 1 and 2, switch 20 is also connected to a power ON delay circuit 26 that in turn is connected to a motion sensor 28. After a preset power on delay time that begins when switch 20 is switched ON, power ON delay circuit 26 allows electrical power from battery 16 to be applied to the motion sensor 28. The power on delay time preferably is about two minutes. Any movement of motion sensor 28 after it is activated by electrical power will cause motion sensor 28 to apply power to an anti-compromise circuit 30, which will then destroy target designation system 10. Anti-compromise circuit 30 preferably is not harmful to nearby personnel in the event it is accidentally activated. Still referring to FIGS. 1 and 2, switch 24 also supplies the power ON/OFF signal to an auto-destruct delay circuit 32. After a preset auto-destruct delay time that is preferably about ten minutes and at a present point in the decay life of the battery 16, auto-destruct delay circuit 32 sends a destruct signal to anti-compromise circuit 30, which then destroys target designation system 10.

Target designation system 10 is used by placing it on or adjacent a possible target, such as a bridge (not shown), that is to be destroyed later. Placement of each target designation system 10 should be identified by serial number and target location.

Target designation system 10 preferably is placed where there is a clear view of the sky and then activated by turning on switch 20 to apply power to receiver 12, decoder/memory circuit 22 and power on delay circuit 26. After the power on delay has elapsed, power is applied to motion sensor 28. Nothing further happens until receiver 12 intercepts a coded signal on a preset frequency from an attack aircraft (not shown) or the like.

After receiver 12 receives a correctly encoded signal at the selected frequency, decoder/memory circuit 22 then applies power from battery 18 to transmitter 14 and to auto-destruct delay circuit 32. Transmitter 14 then sends out a homing signal to guide a smart bomb (not shown) to its location or to the location of the target it is illuminating. The homing signal may be encoded with the serial number of target designation system 10 to identify the target being illuminated in the event that a single signal from the attack aircraft is intended to activate more than one target designation system 10 in the region of interest.

If transmitter 14 includes a laser source, transmitter 14 should include a window 34 where the transmitted laser signal is emitted. Window 34 may be arranged so that it faces the target. In this case, target designation system 10 need not be placed directly on the target, but merely within a distance sufficient to provide guidance for a laser guided smart bomb (not shown). Alternatively, transmitter 14 may have an internal reflective surface (not shown), which reflects an omni-directional homing signal through window 34.

Because of the auto-destruct delay circuit 32, transmitter 14 operates for a maximum time equal to the auto-destruct delay time during which ordnance should be delivered to the target for its destruction. If target designation system 10 is not destroyed by direct impact or by movement of motion sensor 28 from the blast of the ordnance, it will be destroyed by automatic activation of anti-compromise circuit 30 at the end of the auto-destruct delay time. Target designation system 10 is preferably destroyed to prevent it from being compromised by target defenders. The auto-destruct delay can be reset if receiver 12 intercepts a correctly coded signal to turn OFF transmitter 14 and auto-destruct delay circuit 32 before the auto-destruct delay time has elapsed. Transmitter 14 can be activated again if a new coded signal is received by target designation system 10.

What is claimed is:

1. A target designation system for indicating a target to be destroyed by remotely guided ordnance, comprising:
    a receiver arranged to produce a receiver output signal in response to an incident electromagnetic signal;
    an auto-switch arranged to provide a power signal;
    a decoder/memory circuit connected between said receiver and said auto-switch, said decoder/memory circuit, responsive to said incident electromagnetic signal, producing an ON/OFF signal that selectively turns the auto-switch ON and OFF when the incident electromagnetic signal has a predetermined frequency and is encoded with a preset code;
    a transmitter connected to said auto-switch to receive said power signal, said transmitter being activated by said power signal, said transmitter transmitting a homing signal after said transmitter is activated by said power signal, said homing signal indicating a location for said transmitter;
    a first electrical power source;
    a manual switch connected between said first electrical power source and said receiver and between said first electrical power source and said decoder/memory circuit, said receiver and said decoder/memory circuit being activated by receiving electrical power from said first electrical power source when said manual switch is turned on; and
    a second electrical power source for generating said power signal, said second electrical power source being connected between said auto-switch and said transmitter, said auto-switch providing said power signal from said second electrical power source to said transmitter when said auto-switch is turned on by said ON/OFF signal from said decoder/memory circuit.

2. The target designation system of claim 1 wherein said predetermined frequency and preset code identify said target designation system by serial number and location.

3. The target designation system of claim 1, further comprising:
    a motion sensor connected to said manual switch and arranged to produce a destruct signal in response to motion of said target designation system; and
    an anti-compromise circuit connected to said motion sensor and arranged to destroy said target designation system in response to said destruct signal.

4. The target designation system of claim 3, further comprising a power ON delay circuit connected between said motion sensor and said manual switch, said power ON delay circuit being arranged to provide a selected power ON delay time between when said manual switch is turned ON and application of electrical power to said motion detector.

5. The target designation system of claim 3, further comprising an auto-destruct delay circuit connected between said auto-switch and said anti-compromise circuit, said auto-destruct delay circuit being arranged to activate said anti-compromise circuit after a preset auto-destruct delay time from when said auto-switch is turned ON.

6. The target designation system of claim 3, further comprising a power ON delay circuit connected between said motion sensor and said manual switch, said power ON delay circuit being arranged to provide a selected power ON delay time between when said manual switch is turned ON and electrical power is applied to said motion detector.

7. A target designation system for indicating a target to be destroyed by remotely guided ordnance, comprising:
    a receiver arranged to produce a receiver output signal in response to an incident electromagnetic signal;
    an auto-switch connected to said receiver and arranged to produce a power signal in response to said receiver output signal;
    a transmitter connected to said auto-switch, said transmitter being activated by said power signal produced by said auto-switch, said transmitter transmitting a homing signal after being activated by said power signal, said homing signal indicating a location for said transmitter;
    a motion sensor connected to said receiver and arranged to produce a destruct signal in response to motion of said target designation system;
    an anti-compromise circuit connected to said motion sensor and arranged to destroy said target designation system in response to said destruct signal; and
    an auto-destruct delay circuit connected between said auto-switch and said anti-compromise circuit, said auto-destruct delay circuit being arranged to produce an auto-destruct signal in response to receipt of said power signal produced by said auto-switch after a preset auto-destruct time has elapsed.

8. The target designation system of claim 7, further comprising a decoder/memory circuit connected between said receiver and said auto-switch, said decoder/memory circuit being arranged to produce an ON/OFF signal that selectively turns the auto-switch ON and OFF when the incident electromagnetic signal has a predetermined frequency and is encoded with a preset code.

9. A target designation system for indicating a target to be destroyed by remotely guided ordnance, comprising:

a receiver arranged to produce a receiver output signal in response to an incident electromagnetic signal;

an auto-switch arranged to provide a power signal;

a decoder/memory circuit connected between said receiver and said auto-switch, said decoder/memory circuit, responsive to said incident electromagnetic signal, producing an ON/OFF signal that selectively turns the auto-switch ON and OFF when the incident electromagnetic signal has a predetermined frequency and is encoded with a preset code;

a transmitter connected to said auto-switch to receive said power signal, said transmitter being activated by said power signal, said transmitter transmitting a homing signal after said transmitter is activated by said power signal, said homing signal indicating a location for said transmitter;

a decoder/memory circuit connected between said receiver and said auto-switch, said decoder/memory circuit being arranged to produce an ON/OFF signal that selectively turns the auto-switch ON and OFF when the incident electromagnetic has a predetermined frequency and is encoded with a preset code;

a first electrical power source;

a manual switch connected between said first electrical power source and said receiver and between said first electrical power source and said decoder/memory circuit, said receiver and said decoder/memory circuit being activated by receiving electrical power from said first electrical power source when said manual switch is turned on;

a second electrical power source for generating said power signal, said second electrical power source being connected between said auto-switch and said transmitter, said auto-switch providing said power signal from said second electrical power source to said transmitter in response to said auto-switch being turned on;

a motion sensor connected to said manual switch to receive said electrical power from said first electrical power source when said manual switch is turned on, said electrical power from said first electrical power source activating said motion sensor which when activated produces a destruct signal in response to motion of said target designation system;

an anti-compromise circuit connected to said motion sensor and arranged to destroy said target designation system in response to said destruct signal; and an auto-destruct delay circuit connected between said auto-switch and said anti-compromise circuit, said auto-destruct delay circuit being arranged to produce an auto-destruct signal in response to receipt of said power signal produced by said auto-switch after a preset auto-destruct time has elapsed.

* * * * *